Oct. 24, 1961    R. C. WILLIAMS    3,005,629
SELF-ADJUSTING STABILIZER FOR SPRING SUSPENSION
Filed Sept. 17, 1957    2 Sheets-Sheet 2

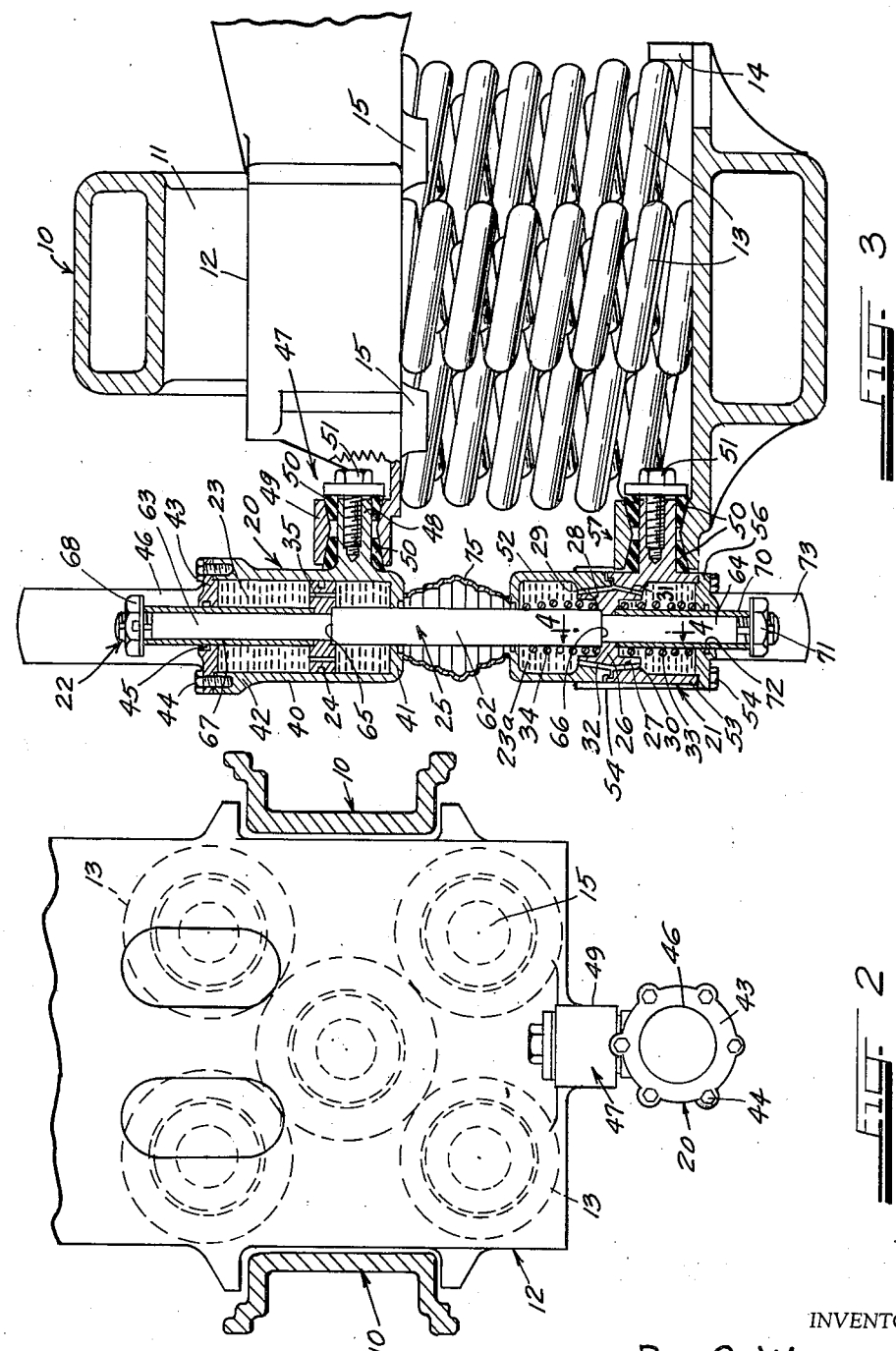

INVENTOR.
Ray C. Williams
BY
Harvey M. Gillespie
ATTY.

United States Patent Office 3,005,629
Patented Oct. 24, 1961

3,005,629
SELF-ADJUSTING STABILIZER FOR
SPRING SUSPENSION
Ray C. Williams, Chicago, Ill., assignor to Standard
Car Truck Company, Chicago, Ill., a corporation of
New Jersey
Filed Sept. 17, 1957, Ser. No. 684,603
2 Claims. (Cl. 267—8)

The present invention relates to an improved self-adjusting stabilizing mechanism for a spring suspension. It has been designed for use as a means for stabilizing the undulations of the spring suspension structure of a railway car truck whereby the indulations of a set of load supporting springs are effectively damped. It is to be distinctly understood however that the invention is capable of other uses and the present stabilizing mechanism will be found useful in connection with motor vehicle or trailer suspension system, shock absorber means for aircraft landing gear or, in fact in connection with the damping of spring oscillations of objectional amplitudes, between two relatively movable bodies which are subjected to forces tending to move them relative to each other. Irrespective however of the particular use to which the present invention may be put, the essential features thereof are at all times preserved.

Spring suspension devices which are provided with friction type snubbing means employing friction shoes and cooperating wear plates for damping the oscillations between two relatively movable bodies, and especially variable load carrying bodies such as the bolster of a railway freight car for example which must be resiliently supported at each end from the car truck frame, are subject to variations in their operating characteristics, depending upon the initial load applied to the bolster at the time of any given run. The helical type of spring which is widely employed for supporting the weight of the railway freight car is quite satisfactory for this purpose but it is subject to harmonic vibrations in more or less direct proportion to the initial load, such vibrations being occasioned by various factors as for example when the ends of the rails are slightly elevated or depressed and the speed is such as to cause the wheel treads to move over the rail joints at a rate commensurate with the natural period of vibration of the spring assembly. In such an instance the vibrations will build up inordinately, particularly if the car is heavily loaded, sometimes to an extent which is beyond the ability of the snubbing devices associated with the spring suspension to assimilate them so that the springs will go solid and break or otherwise damage the frame. In other words, conventional snubbing devices associated with such spring assemblies are effective only throughout a predetermined range of vibrational amplitudes and, when the car is initially heavily loaded the springs are subjected to an initial displacement or deformation which remains permanent as long as the load is present. This initial displacement brings the friction shoes and their associated wear plates well into their effective working range at the outset so that when subsequent harmonic vibrations become effective as previously described, the peaks of such vibrations, i.e. the relatively large displacement amplitudes, will tend to either move the shoes and wear plates out of register or to cause them to jam so that the friction snubbing devices do not have the ability to dampen such vibrations and the springs will reach the limit of their free elasticity and go solid.

The present invention is designed to overcome the above noted limitations that are attendant upon the use of conventional friction type stabilizing devices and, toward this end, it contemplates the provision of a novel form of hydraulic snubbing or vibration dampening means which may be operatively associated with a wide variety of spring suspension assemblies and which has the necessary capacity and will operate under all conditions of load to prevent harmonic vibrations of the assembly. According, it is among the principal objects of the present invention to provide a vibration dampening means which will, at the outset and regardless of the applied load, assume a neutral condition with the snubbing element of the dampening means being positioned substantially at the exact center of its effective snubbing stroke so that whenever vibrational effects are encountered, in either direction of displacement, the snubbing element will be immediately effective to apply its full snubbing action without moving out of its snubbing range.

In carrying out the above mentioned object, the invention contemplates the provision of a snubbing means which is essentially hydraulic in its operation, depending as it does upon the resistance offered by a solid column of a liquid to the snubbing member proper. Briefly, the invention provides a first hydraulic piston and cylinder assembly wherein the piston is interposed between two solid columns of liquid and through which piston the liquid is capable of being bled uniformly from one side of the piston to the other so that only gradual piston displacements are possible. The cylinder is bodily movable with the bolster to which it is rigidly attached. A second hydraulic piston and cylinder assembly wherein the piston is likewise interposed between two solid columns of liquid is also provided and the cylinder of this latter assembly is fixedly secured to and moves bodily with the truck frame. The second piston constitutes the snubbing element per se and this piston has associated therewith automatically operable valve means whereby the bleeding action across the piston from one column of liquid to the other is regulated in proportion to the extent of its displacement from a medial or mean position within the cylinder in which it operates.

While the first piston may exert some snubbing action limiting sudden relative displacements between the bolster and truck frame, its primary function is of an equalizing nature wherein the application of a load to the bolster or the removal of a load from the bolster tending to lower or elevate the bolster on its support, i.e. the truck frame, will, by a bleeding of the liquid from one side of the piston to the other, cause the piston to seek an equalized position within its respective cylinder.

The two pistons are rigidly connected together so that they move in unison and means are provided for yieldingly biasing the piston of the second piston and cylinder assembly so that it will assume its mean or medial position in the cylinder. By such an arrangement, it follows that since the two columns of liquid on opposite sides of each piston are capable of being bled through or around the piston, the biasing means will under all static conditions of the bolster and car truck be effective to urge the two rigidly connected pistons to positions of equilibrium in the hydraulic system, regardless of the imposed load on the bolster. In other words, a new load on the bolster will merely effect a new position of equilibrium for the two pistons as a unit, and in each position of equilibrium, the second or snubbing piston per se will assume its medial or mean position.

With the second or snubbing piston in this medial or mean position within its respective cylinder, it is at all times, regardless of the load or lack of load, maintained in readiness for immediate snubbing operation within the working range of which it is capable whenever sudden vibrational effects are encountered which it is desired shall be nullified or otherwise rendered harmless. Because of the automatic valve action previously mentioned, and the nature of which will be set forth fully hereinafter, the extent of the snubbing action presented by the snubbing piston will be substantially directly proportionate to the demand for such snubbing action as evidenced by the amplitude of displacement between the bolster and car truck from any given relative position of equilibrium.

The provision of a stabilizing mechanism of the character briefly outlined above being among the principal objects of the invention, it is a further object to provide a device of this sort which is effectively sealed against the entrance of dirt or other foreign material into the operative working parts thereof, either hydraulic or mechanical, and which will remain thus effectively sealed throughout the entire life of the mechanism.

A still further object of the invention, in a mechanism of this character, is to provide a stabilizing mechanism which may be readily applied to existing installations and which, for this purpose, is capable of immediate application to the two relatively moving bodies without requiring preliminary adjustment or fitting of parts and which furthermore, when so applied, will assume a condition for immediate use with the snubbing mechanism associated with the assembly assuming its neutral condition automatically as previously described.

The provision of a stabilizing apparatus which is relatively simple in its construction and which therefore may be manufactured at a low cost; one which is rugged and durable and which therefore is possessed of a relatively long life; one which is comprised of a minimum number of moving parts and which therefore is unlikely to get out of order; one which when assembled and installed in a desired environment is readily accessible for purposes of inspection, disassembly for replacement of parts or repair if necessary, and one which otherwise is well adapted to perform the services required of it, are further desirable features which have been borne in mind in the production and development of the present invention.

Other objects and advantages of the invention, not at this time enumerated, will become readily apparent as the following description ensues.

In the accompanying two sheets of drawings forming a part of this specification a preferred embodiment of the invention has been shown.

In these drawings:

FIG. 2 is a sectional view taken substantially along the line 2—2 of FIG. 1.

FIG. 3 is a sectional view taken substantially along the line 3—3 of FIG. 1 with the load springs of the car truck and the truck bolster being shown in elevation.

Figure 1:
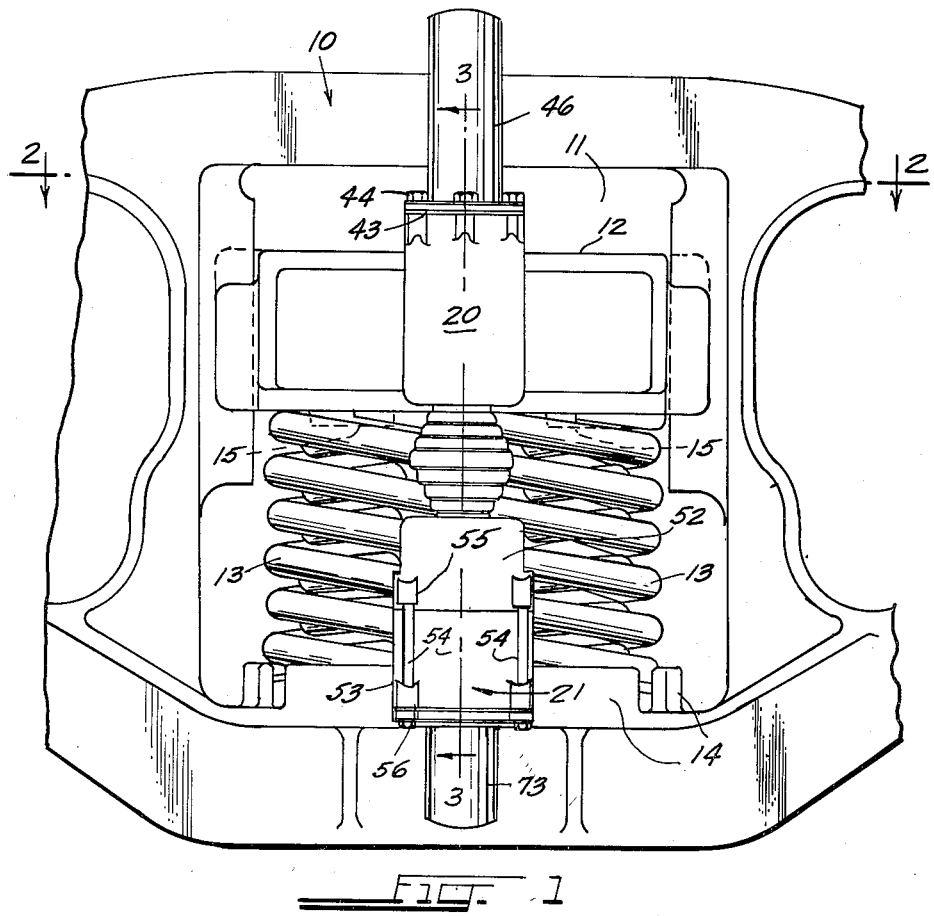
FIG. 1 is a fragmentary side elevation view of an improved stabilizing device constructed in accordance with the principles of the present invention, showing the same operatively installed by way of example between a railway car truck frame and an associated bolster the movements of which it is desired to dampen.

Referring now to the drawings in detail, the side frame of a railway car truck is designated in its entirety at 10 and is provided with the usual bolster window 11 therein for reception of one end portion of a bolster 12. The bolster 12 is yieldingly supported by a group or nest of relatively heavy coil springs 13 which are maintained seated at their lower ends on the frame 10 by means of upstanding lugs or flanges 14 and at their upper ends by means of suitable centering lugs 15. The side frame 10 is provided at its opposite ends with the usual arrangement of supporting wheels (not shown) which cooperate with a similar arrangement of wheels and associated parts at the opposite side of the car truck and by means of which the truck may be supported on rails from the traction surface or ground. The arrangement of parts thus far described is more or less conventional in its design and it will be understood that any load which may be applied to the railroad car is in turn applied to the bolster 12 and from thence distributed through the load springs to the side frame 10. The load springs 13 are, of course, compressed in direct proportion to the applied load and, during operation of the car, these springs are subject to the usual vibrational effects as the car wheels pass over the rail joints or other irregularities in the roadbed surface and which vibrational effects it is desired to dampen according to the present invention.

Figure 4:
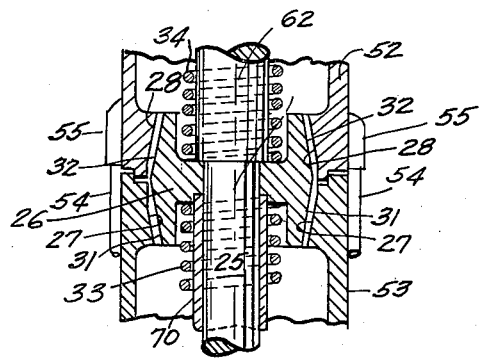
FIG. 4 is an enlarged detail sectional view taken substantially on line 4—4 of FIG. 3.

The details of the present stabilizing system are best illustrated in FIG. 3 wherein there is shown an upper hydraulic equalizing cylinder assembly 20 operatively and fixedly secured to the bolster 12 for movement bodily therewith, a lower hydraulic snubbing cylinder assembly 21 operatively and fixedly secured to the side frame 10 for movement bodily therewith, and an interconnecting thrust rod or plunger assembly 22. Briefly, and as will be described in greater detail presently, the upper cylinder assembly 20 serves to confine a column or body 23 of an incompressible liquid so that the liquid is constrained to move bodily with the cylinder assembly and transmit its vertical movements to an hydraulic piston 24 mounted on a thrust rod proper 25. The thrust rod 25 carries a combined snubbing piston and valve member 26 which is disposed and operates within the lower snubbing cylinder containing a body of the liquid designated 23a. The said valve member 26 cooperates with a pair of adjacent frusto-conical valve surfaces 27 and 28 when the thrust rod 25 is displaced in a downward or an upward direction respectively. The upper frusto-conical surface 28, in effect, defines a valve port 29 and the lower frusto-conical surface 27 defines, in effect, a valve port 30, the said piston or valve member 26 operating between the two ports and having frusto-conical surfaces 31 and 32 (FIG. 4) opposing the two surfaces 27 and 28.

The piston and valve member 26, which will hereinafter be referred to as the valve piston, is normally and yieldingly maintained in a "neutral" position of equilibrium out of contact with either surface 27 or 28 midway between the two ports 29 and 30 by means of a pair of biasing springs 33 and 34 which center the piston, so to speak, between the two frusto-conical surfaces 27 and 28 but which yield to permit cooperating valve action with either surface when undesired displacements in either direction are encountered. Movement of the valve piston 26, under the influence of its biasing springs 33 and 34 to its neutral position of equilibrium is made possible by virtue of one or more bleeding apertures 35 provided in the equalizing piston 24 whereby the liquid 23 may be gradually bled from one side of the piston to the other and whereby initial compression of the coil springs 13 or expansion thereof under the influence of loading or unloading respectively of the railway car will cause the biasing springs 33 and 34 associated with the valve piston 26 to relieve themselves gradually of any compressional forces which may be applied thereto so that these springs will ultimately bring the valve piston 26 to its neutral position regardless of the initial load involved. Such is the general nature and operation of the present stabilizing mechanism of the present invention and it remains merely to describe in more detail some of the operating instrumentalities associated therewith so that a full understanding of the invention may be had.

Referring now to FIG. 3, the upper hydraulic cylinder assembly 20 comprises an upright cup-shaped cylinder block 40 having a base portion 41 through which the thrust rod assembly 22 extends and having an upper thickened rim portion 42 which is closed by means of a closure plate 43 held in position on the rim by studs 44. The thrust rod assembly 22 likewise projects through the closure plate 43 and is sealed for sliding movement therein by a conventional sealing gland 45. A dust cap 46 serves to exclude dirt or other foreign material from the gland 45. The cylinder is attached to the bolster 12 through a flexible connection 47 which permits limited angular movement between the two parts to compensate for lengthwise movement of the bolster while at the same time constraining the cylinder to follow the vertical movements of the bolster. This connection is in the form of a stud-like projection 48 which may be integrally formed on the cylinder block 40 and which is centered within a a tubular eyelet or boss 49 integrally formed on the bolster by means of a pair of rubber or other resilient mounting sleeves 50. The various parts are held in position by stud and washer assemblies 51.

The lower snubbing cylinder assembly 21 comprises a composite inverted cup-shaped block assembly comprising upper and lower block sections 52 and 53 respectively arranged in axial alignment and maintained in juxtaposition by means of elongated clamping studs 54 which have their ends threadedly received in lugs 55 (FIG. 1) formed on the section 52 and which also pass through and serve to maintain a closure plate 56 similar to the plate 43 in position on the lower open rim of the composite block assembly. The block section 53 is connected to the side frame 10 by a flexible connection 57 which may be identical with the connection 47 previously described and which therefore needs no further description herein. The adjacent rim portions of the two block sections 52 and 53 are formed with thickened portions which, when the sections are assembled upon each other afford the previously described valve surfaces 27 and 28. These two surfaces are of frusto-conical configuration and are designed for selective hydraulic action with the similar but complementary surfaces 31 and 32 respectively (see also FIG. 4) formed on the piston or shoe 26.

The thrust rod or plunger assembly 22 includes the previously mentioned thrust rod proper 25 which is formed with a medial portion 62 of enlarged diameter and with upper and lower end portions 63 and 64 respectively of reduced diameter, affording shoulders 65 and 66 at the ends of the enlarged medial portion 62. The upper hydraulic equilizing piston 24 which operates in the cylinder block 40 is of cylindrical configuration and is maintained fixed on the thrust rod 25 by means of a sleeve 67 which serves to clamp the piston 24 against the shoulder 65. A clamping nut and washer assembly 68 on the upper end of the rod 25 serves to effect the clamping action. The valve piston 26 is similarly maintained on the rod 25 within the cylinder assembly 21 by means of a sleeve 70 and a clamping nut and washer assembly 71 on the lower end of the rod 25, the sleeve 70 serving to force the valve piston 26 against the shoulder 66.

The reduced portion 64 of the thrust rod 25, as well as the surrounding sleeve 70 projects downwardly and outwardly through the closure plate 56 through which they are slidable and in which they are sealed by a gland 72 similar to the gland 45. A dust cap 73 shields the gland 72 against the entrance of dirt and the like. In the medial regions of the stabilizer assembly a corrugated flexible sleeve 75 surrounds the enlarged medial portion 62 of the thrust rod 25 and bears at its end against the opposed outer end surfaces of the upper and lower cylinder assemblies 20 and 21 to thus shield this portion of the rod against accumulation of dirt which, otherwise, would be subject to entrance into the cylinder assemblies at the regions of entrance of the rod 25.

The biasing spring 34 surrounds the enlarged portion 62 of the rod 25 and bears at its upper end against the upper end wall of the cylinder block section 52 and at its lower end against the valve piston 26. The biasing spring 33 surrounds the reduced portion 64 of the rod 25 and bears at its lower end against the closure plate 56 and at its upper end against the valve piston 26. The compression of the two springs 33 and 34 is matched so that the valve piston 26 "floats" so to speak within the medial region of the cylinder assembly 21 and so that the surfaces 31 and 32 (FIG. 4) remain in close proximity to but out of actual contact with their cooperating valve surfaces 27 and 28 on the inner faces of the cylinder block sections 53 and 52 respectively. As previously described, the biasing action of the two biasing springs 33 and 34 is controlling insofar as the positioning of the valve piston 26 is concerned inasmuch as any pressure which may be built up within the cylinder assembly 20 in the body of liquid 23 therein on either side of the piston 24 due to loading or unloading of the railway car and consequent displacement of the bolster 12 with respect to the car truck frame 10 will become equalized on opposite sides of the piston 24 through gradual passage of the liquid through the openings 35. Regardless of the applied load therefore, the biasing springs 33 and 34 will ultimately bring the valve piston 26 to its inoperative or neutral position out of contact with the bearing surfaces 27 and 28 although the distance between the upper and lower cylinder assemblies 20 and 21 will become decreased or increased as the load is increased or decreased respectively.

While the railway car is traveling over a roadbed, abnormal or sudden shocks which are applied to the car truck or frame 10 due to unevenness of the rails on the roadbed for example or for any reason whatsoever while the car is in motion will be transmitted to the snubbing cylinder assembly 21, thus displacing the cylinder proper vertically in one direction or the other. If, for example, a rise caused by an undulation in one of the track rails is encountered, the car truck frame, together with the cylinder 21 will be displaced upwardly, thus compressing the load springs and also placing the liquid 23a in the lower portions of the lower cylinder 21 under pressure. The pressure thus developed in the liquid in the cylinder 21 below the valve piston 26 will tend to cause the liquid to be bled to the opposite or upper side of the cylinder 21 while at the same time the resistance offered by the piston to the incompressible column of liquid during the bleeding action constituting a major portion of the snubbing or reaction force to the displacement between the bolster and car truck frame. Since, except for the provision of the centering springs 33 and 34, the piston and piston rod assembly 24, 25, 26 is a free floating member, the reaction offered by the piston 26 as previously described, will cause a gradual shifting movement of the piston rod 25 upwardly, the upper portion of the liquid 23 in the upper cylinder 20 will be placed under pressure so that the piston 24, like the piston 26, will offer a certain amount of reaction force to the relative displacement between the bolster and car truck frame. The function of the piston 24 however is an equalizing one as previously described and the major portion of the snubbing action is borne by the lower piston 26. The frusto-conical shape of valve piston 26 with its cooperating surfaces 31, 32 is such that movement of the cylinder 21 relative to valve piston 26 increases the resistance to flow of liquid 23a thereby increasing the snubbing force. This snubbing effect is increased in proportion to the amplitude of the forcing movement of the cylinder 21.

In a similar manner, downward movements of the car truck frame relative to the bolster will cause the liquid in the upper and lower portions respectively of the cylinder assemblies 20 and 21 to be placed under pressure with the pistons 24 and 26 offering the desired reaction force as the liquid is slowly bled upwardly through or around the pistons as the case may be.

In compliance with Title 35, U.S. Code, section 22, a preferred embodiment of the invention has been shown in the drawings and described herein, but it should be understood that the invention is not to be limited to the specific disclosure made and that the appended claims should be construed as broadly as the prior art will permit.

I claim:

1. A stabilizing mechanism for damping oscillations of a spring supported body constituting one of a pair of bodies movable relative to each other from different normal positions, said mechanism comprising an hydraulic equalizing cylinder for attachment to and movable with said spring supported body, a snubbing cylinder for attachment to and having positive movement with the other body, an axially movable thrust rod common to and extending through both cylinders, an equalizing piston secured to said rod within the equalizing cylinder, a combined snubbing piston and valve secured to said rod within the snubbing cylinder, separate bodies of fluid media sealed in the separate cylinders and substantially filling them, means establishing a restricted by-pass for fluid across said equalizing piston, a pair of longitudinally spaced apart valve seats fixed to the inner wall of the snubbing cylinder in equally spaced relation to the combined snubbing piston and valve when the latter is in its neutral position, the said seats serving as stops for abruptly limiting the movements of the combined snubbing piston and valve from its neutral position and also cooperating therewith to define an annular passageway for fluid around the combined snubbing piston and valve, which passageway is progressively restricted by the movement of the said combined piston and valve from its neutral position, whereby the several parts of the mechanism cooperate during relative movements of said cylinders toward and away from each other from assumed normal positions to create increased pressure differentials at opposite sides of said equalizing piston and at opposite sides of said combined snubbing piston and valve and whereby continued movement of said equalizing cylinder and the body to which it is attached is damped by said pressure differential in said equalizing cylinder, and spring means abutting against at least one of said cylinders and effectively engaged with said rod to exert spring force thereon to adjust said combined snubbing piston and valve to its neutral position upon cessation of relative movement of said cylinders.

2. A stabilizing mechanism as set forth in claim 1 characterized in that said longitudinally spaced apart valve seats have frusto-conical surfaces and the perimeter of the combined piston and valve associated therewith is formed with frusto-conical surfaces opposed to the frusto-conical surfaces of said seats and cooperate therewith to define said annular passageway.

References Cited in the file of this patent

UNITED STATES PATENTS

| | | |
|---|---|---|
| 2,199,145 | Watson | Apr. 30, 1940 |
| 2,649,938 | Crabtree | Aug. 25, 1953 |
| 2,671,536 | Jurasevich | May 9, 1954 |
| 2,705,633 | Potter, et al. | Apr. 5, 1955 |
| 2,713,401 | Serste et al. | July 19, 1955 |
| 2,746,744 | Blattner | May 22, 1956 |
| 2,782,731 | Blattner | Feb. 26, 1957 |
| 2,861,795 | Blake | Nov. 25, 1958 |
| 2,917,303 | Vierling | Dec. 15, 1959 |
| 2,934,332 | Mercier | Apr. 26, 1960 |

FOREIGN PATENTS

| | | |
|---|---|---|
| 9,712 | Great Britain | Apr. 25, 1906 |